United States Patent Office 2,818,435
Patented Dec. 31, 1957

2,818,435

MONOCYCLIC TERPENE ALCOHOLS FROM VERBENOL AND THE PROCESS OF THEIR OXIDIZATION

Joseph P. Bain, Eugene A. Klein, Harry G. Hunt, and Albert B. Booth, Jacksonville, Fla., assignors to The Glidden Company, Cleveland, Ohio, a corporation of Ohio No Drawing. Application July 15, 1953
Serial No. 368,210

5 Claims. (Cl. 260—587)

The present invention relates to the preparation of monocyclic alcohols from verbenol and its allylomer 3-pinene-2-ol and mixtures thereof.

Verbenol is known to yield verbenene, a dicyclic hydrocarbon, when boiled with acetic anhydride and to yield p-cymene when treated with phosphorous pentoxide or zinc chloride. Thus, it was known to prior art to treat verbenol for production of hydrocarbons, but it was not known to convert verbenol to monocyclic alcohols, nor was it appreciated that this conversion was possible. We have found that verbenol may be treated to provide new monocyclic monohydric tertiary alcohols representing both the ortho- and the para-menthane series and containing a conjugate system of double bonds as well as a dihydric alcohol of the para-menthane series. In addition to these hydroaromatic alcohols there is formed some 8-cymenol. The monocyclic alcohols are compounds of pleasant odor which may be employed as odorants or may be converted to disinfectant compositions similar to those produced from pine oil. Further, they are capable of reactions characteristic of tertiary alcohols and of conjugated dienes. They may be employed as wetting agents for those purposes for which pine oil is suited, such as flotation reagents, fiber scouring, etc. They are capable of undergoing selective hydrogenation individually or collectively to yield monohydric tertiary alcohols containing a single double bond whereby those of the p-menthane series yield α-terpineol and the alcohol of the ortho-menthane series yields an o-terpineol. Saturation with hydrogen, of course, yields the dihydroterpineols. When the alcohols are prepared from optically active verbenol, they are also optically active and when hydrogenated, they yield the optically active terpineols. Further, the dihydric alcohol produced in our treatment of verbenol is capable of conversion to an isopulegyl derivative and to menthol, and when this dihydric alcohol is prepared from optically active verbenol, it is also optically active and convertible to optically active menthols and menthones.

In the copending application of Bain et al., Serial No. 352,291, filed April 30, 1953, there is disclosed a method for obtaining the cis- and trans-forms of a new alcohol from the air oxidation mixture of α-pinene. This new alcohol, 3-pinene-2-ol, is obtained in substantial yield, and since it is converted to verbenol under the conditions which we describe here for the conversion of verbenol to monocyclic alcohols, it is the equivalent of verbenol when treated by the procedures disclosed herein. The new and useful monocyclic alcohols described herein may therefore be obtained by the use of either the 3-pinene-2-ols or verbenol or mixtures thereof as starting material for the process of the present invention.

The conversion of 3-pinene-2-ol to verbenol is more fully described and claimed in the copending application of Bain and Gary, Serial No. 376,997, filed August 27, 1953.

It is therefore an object of the present invention to provide a process for producing menthadienols.

Another object is to provide a process for producing optically active menthadienols.

Another object is to provide a process for producing a menthenediol.

Another object is to provide a process for converting dicyclic alcohols derivable from air oxidation of α-pinene to tertiary alcohols of the menthane series.

Another object is to provide a process for converting optically active unsaturated, secondary dicyclic alcohols of the pinane series to optically active alcohols of the menthane series.

Another object is to provide a process for converting 3-pinene-2-ol- and/or verbenol to menthol and other valuable products.

Other objects will be apparent from the following description.

As shown in application Serial No. 352,291, 3-pinene-2-ols can be produced by treating the mixture resulting from air oxidation or other gaseous oxygen oxidation of α-pinene with excess sodium sulfite or other suitable reducing agent capable of reacting with peroxides under non-acidic conditions and then fractionally distilling the reduced mixture, the fractions boiling in the range about 75° C. to 85° C. at 10 mm. being enriched in 3-pinene-2-ol. This fraction, or either of the two individual forms of 3-pinene-2-ol which exist therein and which are separable as by means of high efficiency fractional distillation, is suited to conversion to the new monocyclic alcohols disclosed herein. Further, the fraction boiling in the range about 75° C. to 100° C., at 10 mm., and containing both 3-pinene-2-ol and verbenol is likewise suitable for this conversion. It will be appreciated that crude fractions of pinene air or other gaseous oxygen oxidation products and containing other pinene oxidation products such as myrtenol, myrtenal, verbenone and pinene oxide in addition to 3-pinene-2-ol and/or verbenol may also be employed, if desired, to form monocyclic tertiary alcohols by our process, although we prefer to employ high concentrations of verbenol and/or 3-pinene-2-ol if high concentrations of the monocyclic tertiary alcohols in our treated products are desired so that separations of the individual monocyclic tertiary alcohols may be most easily accomplished, where such separation is necessary or desirable.

In its broadest scope, the present invention is not dependent upon the optical purity of the pinene alcohols employed, but optical purity is of importance in determining the optical rotation of the monocyclic tertiary alcohol products obtained by our treatment and also to some extent in affecting ease of purification of individual alcohols by crystallization procedures since optically active and racemic forms of the products possess somewhat different solubility and melting point characteristics. The degree of optical rotation and the sign of rotation of the pinene alcohols employed also, of course, fixes these characteristics of the various derivatives which may be produced in subsequent processing including the terpineols and menthol.

The flow sheet indicates the nature of the treatment of the pinene alcohols, verbenol and 3-pinene-2-ol, by our present invention and the products which are produced by this treatment. The equivalency of these allylomeric pinene alcohols is indicated and the equivalency extends further to the cis- and trans-forms of each of the two pinene alcohols. Thus, cis- and trans-verbenol and cis- and trans-3-pinene-2-ol are each and all capable of the conversions indicated. The relative proportions of the various products depends upon the exact conditions employed for the treatment. For example, milder treatments are employed to yield larger proportions of the β-phellandrene alcohol, while less mild treatments result in a product richer in the α-phellandrene alcohol. Thus, slightly different modifications of treatment can be suitably employed for the purpose of securing an optimum yield of a mixture resulting from the treatment and having a composition richest in the particular alcohol component or components desired.

ditions of treatment to produce monocyclic alcohols are accordingly not critical but are most satisfactory if lower temperatures are employed when strong acids or more concentrated acids are employed or, alternatively, if higher temperatures are employed when the acid is weak

FLOW SHEET

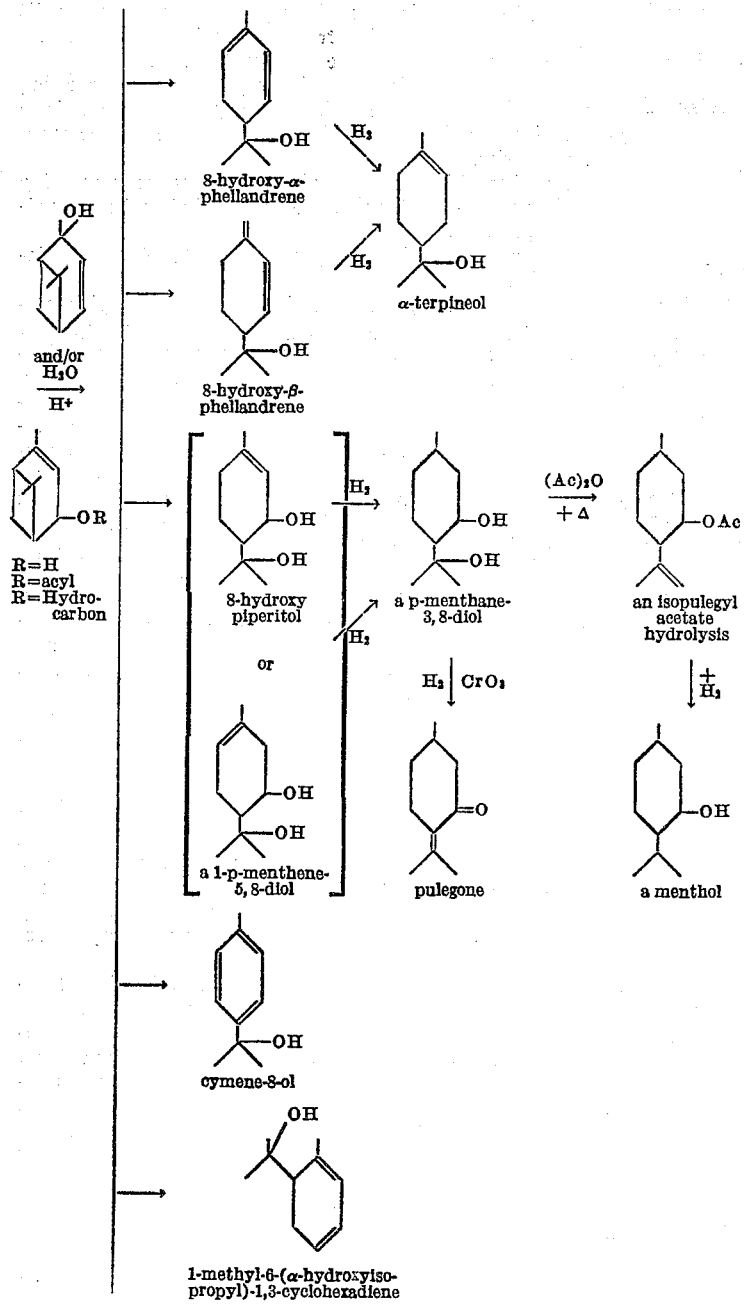

In general, our treatment consists of treating verbenol or 3-pinene-2-ol or mixtures containing these with acids under such conditions that conversion of the pinene alcohols occurs but little or no dehydration to hydrocarbons takes place. Thus, aqueous mineral or organic acids at low temperatures are suited to the desired conversions and good results are obtained when such aqueous acids are agitated with the pinene alcohol under controlled temperature conditions. If the same concentrations of these aqueous acids as are suited to low temperature conversions are employed at higher temperatures, there will be a tendency for hydrocarbons to be produced. Therefore, more dilute or weaker acids may be more suitably employed at these higher temperatures. The conor more dilute. At higher temperatures, even distilled water is sufficiently acidic to bring about the desired conversions as will be shown in the examples but at lower temperatures we prefer to depress the pH of the aqueous or polar phase by acidification. Acidification can, of course, be accomplished not only by use of an acid but also by use of a salt such as zinc chloride, sodium bisulfite, etc., or if desired, the pH of the aqueous phase may be adjusted by employing buffers. It is accordingly possible to achieve the objects of our invention by means of a wide range of experimental procedures whereby the acidity of the aqueous phase is varied inversely with the temperature of the reactants.

Further, we have found that certain derivatives of the specified pinene alcohols are also suitable for processing by our treatment as, for example, ethers as represented by verbenyl methyl ether, see the copending Serial No. 368,208, filed July 15, 1953, and esters as represented by verbenyl acetate. Such derivatives readily convert to the specified monocyclic tertiary alcohols because of the ease with which the verbenyl-oxy-linkage is attacked, so that methanol, acetic acid or other similar grouping is split off by hydrolysis under our operative conditions.

These and other characteristics of our invention are illustrated and further clarified in the following examples.

*Example 1*

Ten and eight-tenths kilos of a mixture consisting of 79% verbenol, $\alpha_D{}^{25}$ about $-140°$ C., (10 cm. tube), and 21% verbenene was stirred with 9.5 liters of 25% phosphoric acid at 25° C. for 47½ hours. Samples were withdrawn from the reacting mixture at intervals and examined by infrared methods. These tests showed that at the end of seven hours, there was some loss of secondary hydroxyl (absorptions at 9.75 and 10.0 $\mu$), but formation of considerable tertiary hydroxyl (strong absorptions at 8.55 and 8.90 $\mu$). Decrease in the optical density of absorption bands characteristic of verbenol, such as those at 11.71, 12.13 and 12.95 $\mu$, indicated that about half of the verbenol had disappeared at this point. The spectra of samples taken at 13, 20.5 and 30 hours showed progressive loss of the secondary hydroxyl group and some increase in the tertiary hydroxyl group. It appeared that rate of decrease in secondary hydroxyl groups was somewhat greater than increase in tertiary hydroxyl groups in this time period. The infrared spectrum of the final sample taken at 47½ hours showed rather weak absorptions in the 9.75-10.0 $\mu$ range (secondary hydroxyl), much weaker than in the sample taken at 20½ hours, and strong absorptions in the 8.5-8.9 $\mu$ range. However, these latter absorptions were not much, if any, stronger than those present in the spectrum of the 20½ hour sample. Thus, the spectra indicated formation of tertiary alcohols at a rate greater than the decrease in secondary alcohols which is consistent with the assumption that verbenol first hydrates to a p-menthene-3,8-diol or a mixture of such diols, which then dehydrates to 8-hydroxy-p-menthadienes.

At the end of the 47½ hour reaction period, the oil and aqueous acid layers were separated and the oil layer was washed with excess 10% sodium hydroxide. Hexane, 1.5 liters, was added to facilitate recovery of the oil from the emulsion produced by this treatment, and then the organic layer was separated and partially dried over sodium carbonate. This product was then fractionated through an efficient column, first at slight vacuum to remove hexane and moisture, then at about 30 mm. to remove hydrocarbons and then at pressures controlled in the range 10-20 mm. for fractionation of the alcohols.

The following compounds were isolated in order of their boiling points:

(A) Recovered verbenene, B. P. about 60-62° C. at 30 mm.

(B) A hydrocarbon, B. P. about 71° C. at 30 mm., $n_D{}^{25}$ 1.4858, whose infrared spectrum showed that it contained a terminal methylene group, a tri-substituted ethylene and a symmetrically di-substituted ethylene group and whose ultraviolet spectrum showed it to possess an absorption maximum at 265 m$\mu$ and a specific extinction coefficient, $$\alpha = E_{1\,cm.}^{g./l.}$$

of 30.8 corresponding to a cyclohexadiene with both double bonds in the ring. This compound was levorotatory indicating the presence of an asymmetric carbon atom. Upon boiling it with 25% sulfuric acid, cymene was the major product formed. These data show this hydrocarbon to be 1,5,8-p-menthatriene.

(C) Cymene was shown by infrared methods to be present in fractions boiling at 67-68° C. at 15 mm.

The total verbenene, 1,5,8-p-menthatriene and cymene, was about equivalent in weight to the verbenene in the starting material, and therefore the triene and cymene were formed from the verbenene.

(D) The first alcohol obtained on this fractionation boiled at 87° C. at 10 mm. pressure, and fractions rich in this compound could be partly frozen and purified by centrifuging off the mother liquor. The product was allowed to warm somewhat in the centrifuge to permit some melting of the crystals so that the liquor so produced would wash out the last traces of the original mother liquor. This process of purification will be referred to hereafter as "liquation." The alcohol so purified showed a freezing point of 16° C., $n_D{}^{25}$ 1.5023, $d_4{}^{28}$ 0.962 and $[\alpha]$ $-335°$. In iso-octane solution it showed an absorption maximum in the ultraviolet at 270 m$\mu$, and at this point a specific extinction coefficient, $$\alpha = E_{1\,cm.}^{g./l.}$$

of 33. Infrared analysis showed it to be a tertiary alcohol containing a symmetrically di-substituted ethylene linkage but no terminal methylene group. Hydrogenation yielded a saturated tertiary alcohol but did not yield a terpineol or dihydroterpineol. Acid dehydration produced a terminal methylene group but no cymene and the tertiary alcohol is therefore not a p-menthane derivative. This hydrocarbon resulting from acid dehydration (accomplished by boiling the tertiary alcohol with an acid clay) was boiled with 5% palladium on carbon for about one hour. The hydrocarbon produced was almost pure ortho-cymene as shown by comparison of its spectrum with that of a pure sample of ortho-cymene.

The above data proves this optically active ortho-substituted tertiary alcohol containing a conjugate system of double bonds, an ortho-menthane derivative, to be 1-methyl-6-($\alpha$-hydroxyisopropyl)-1,3-cyclohexadiene.

(E) 8-hydroxy-$\alpha$-phellandrene was the next higher boiling alcohol. Fractions boiling in the range of 100-103° C. at 15 mm. were rich in this compound and could be partially frozen and purified by the liquation method described above. The pure product was found to have these properties: boiling point 95° C. at 10 mm., $n_D{}^{25}$ 1.4953, freezing point 18.5° C., $d_4{}^{26.6}$ 0.954, $[\alpha]_D{}^{25}$ $+162°$. The infrared spectrum of the product showed it to be a tertiary alcohol possessing a tri-substituted ethylene linkage, a symmetrically di-substituted ethylene linkage, no terminal methylene group and an overall spectrum somewhat resembling that of $\alpha$-phellandrene.

The ultraviolet absorption spectrum showed it to have an absorption maximum at 263 m$\mu$ and specific extinction coefficient, $\alpha$, 23.4 (iso-octane).

On hydrogenation, it accepted one molecular equivalent of hydrogen at room temperature using platinum oxide catalyst and a hydrogen pressure of 20 to 60 lbs./sq. in. to produce $\alpha$-terpineol which was identified by comparison of its spectrum with that of a sample of known pure material. Under the same conditions of hydrogenation but with longer time and addition of fresh catalyst midway in the hydrogenation, most of the compound accepted a second molecular equivalent of hydrogen to form dihydro-$\alpha$-terpineol whose spectrum was identical with that of a known sample.

It is evident from the above data that this new unsaturated tertiary alcohol is 8-hydroxy-$\alpha$-phellandrene.

(F) 8-hydroxy-$\beta$-phellandrene was the next higher boiling product. Fractions boiling in the range 104 to 106° C. at 18 to 19 mm. were particularly rich in this product and could be partly frozen and purified by the liquation method described above to obtain the pure alcohol which showed these properties: boiling point 100° C. at 10 mm., $n_D{}^{25}$ 1.5120, freezing point 36.5° C., $d_4{}^{28.4}$ 0.948, $[\alpha]$ $-17.3°$. The ultraviolet spectrum (iso-octane solvent)

showed a maximum absorption at 232 mµ (same as β-phellandrene) and the specific extinction coefficient $$\alpha = E_{1\,cm.}^{\text{g./l.}}$$

was 134. The infrared spectrum of the compound showed it to be a teritary alcohol possessing a terminal methylene group and a conjugate system of double bonds.

Selective hydrogenation using platinum oxide and hydrogen pressure of 20–60 pounds yielded α-terpineol when one molecular equivalent of hydrogen was absorbed. Further hydrogenation under these conditions and forced by addition of more fresh catalyst yielded dihydroterpineol. These two reduction products were identified by comparison of their spectra with spectra of samples of the known compounds.

(G) 8-hydroxy-cymene (dimethyl-p-cresyl-carbinol or 8-cymenol) was found to be present by infrared methods in fractions of the isomerization product boiling a little above about 100° C. at 10 mm.

At this point, 7.406 kilograms of total distillate was collected and by analysis of each fraction comprising the distillate by infrared and ultraviolet absorption methods, this total distillate collected was found to consist of: 35% hydrocarbons; 15.5% 1-methyl, 6-(α-hydroxyisopropyl)-1,3-cyclohexadiene; 30.5% 8-hydroxy-α-phellandrene; 12.5% of 8-hydroxy-β-phellandrene; and 6.5% of total 8-cymenol, verbenone and unknown alcohols.

(H) From a portion of the products boiling above 8-cymenol and up to about 134° C. at 1½ mm. pressure, there was isolated by redistillation a viscous product which did not crystallize and which contained both secondary and tertiary hydroxyl groups as determined by infrared analysis and was characterized by additional absorption bands in the infrared region at 10.73, 10.95, 11.45, 11.95, 12.23, 12.67, 12.9 and 13.18 microns. It is believed that these absorption bands characterize a single glycol whose reactions are outlined below but possibly one or more of the absorptions may be due to an impurity. It was unsaturated as shown by ready bromine absorption. The product was difficult to purify further but was evidently largely 8-hydroxy-piperitol, particularly in view of the following confirmatory tests:

One hundred twenty-four grams of the unsaturated viscous glycol dissolved in 100 cc. naphtha was hydrogenated at 450 to 600 lbs./sq. in. at 125° C. with nickel catalyst until hydrogen absorption became very slow. The product then still showed unsaturation to bromine amounting to about 10% of one double bond per gram molecular weight.

From a portion of the solution of the hydrogenated product, an 8-hydroxy-menthol, the solvent was evaporated and the viscous glycol was acetylated with excess acetic anhydride over that calculated as necessary to form the diacetate. The acetic acid and excess acetic anhydride was distilled in vacuo to a pot temperature of 150° C., and the product remaining in the flask was further heated at atmospheric pressure to 205° C. The crude product was cooled and washed with dilute sodium carbonate and subjected to infrared analysis which showed it to contain a terminal methylene group as well as acetate ester. The product was then fractionated to yield a distillate boiling at about 55–63° C. at 3 mm. This distillate showed an optical rotation of about 2.5° (10 cm. tube) and infrared analysis absorption bands at about 11.23 and 6.03 µ characteristic of the terminal methylene group and of optical density approximately equivalent to those shown by limonene and other terpenes possessing a single terminal methylene. The compound also showed absorption bands centering at about 8.05 µ and about 9.67 µ characteristic of an acetate group esterifying a secondary alcohol. No hydroxyl absorptions appeared in the infrared spectrum. This compound was therefore an isopulegyl acetate as proven from its method of synthesis and interpretation of its infrared spectrum. Furthermore, it was hydrogenated in naphtha solution (about 50% concentration) until saturated using platinum oxide and hydrogen at 60 lbs./sq. in. pressure and at about 25° C. The hydrogenated solution was analyzed for terminal methylene by infrared analysis, but absorptions characteristic of this group at about 6.03 and 11.2 to 11.3 µ were absent showing that this grouping had been removed by the hydrogenation. The solution of ester in naphtha was now saponified by refluxing with 50% aqueous sodium hydroxide. The organic layer was separated and washed with water, then concentrated by distillation to remove about half the low boiling naphtha. Upon cooling to about −15° C., crystallization took place and the product was filtered. The crystals were shown by infrared analysis to consist chiefly (about 85%) of isomenthol by comparison of the spectrum of this product with the spectrum of a known sample of pure isomenthol, but a little unsaponified ester was present. Most of the ester was removed by pressing out a portion of the crystals on filter paper. The product now melted at 69–71° C. and showed an optical rotation of [α] −22.8° (2.7 g. per 100 cc. in methanol). This incompletely purified product was therefore l-isomenthol which in completely chemically and optically pure form melts at 84° C. and shows [α] −27° (about 4 g. per 100 cc. in ethanol).

Further proof of the nature of the glycol arising from hydration of verbenol and its identification as 8-hydroxy-piperitol was obtained by oxidation of the 50% naphtha solution of 8-hydroxy-menthol obtained by the hydrogenation treatment as described above. The saturated glycol was oxidized by means of Beckmann's chromic acid at 30 to 35° C. The intermediate 8-hydroxy-menthone was not isolated but the acidic crude whole oxidation mixture was steam distilled, and several small fractions with a slight minty, camphoraceous odor were collected. One of these showed an absorption maximum in the ultraviolet region at 244–245 mµ (in iso-octane) and specific extinction coefficient, $$\alpha = E_{1\,cm.}^{\text{g./l.}}$$

of 48. This fraction when examined in the same way but using methanol as the solvent for ultraviolet analysis showed the absorption maximum at 252–253 mµ and a specific extinction coefficient only slightly less than in iso-octane solution. These data are in good agreement with those reported for pulegone except that the product obtained in this experiment was contaminated with some of the naphtha solvent.

*Example 2*

A mixture of 200 grams of pure verbenol and 200 grams of water was refluxed at atmospheric pressure for 22 hours. A sample taken after 10 hours of refluxing contained about 20% of unreacted verbenol and 80% of tertiary alcohols as shown by infrared spectrophotometric methods. At 10 hours there was only a one-gram loss in the weight of the oil, indicating very little hydrocarbon formation. An infrared spectrum of the final reaction mixture after a total of 22 hours' refluxing showed very little, if any, unreacted verbenol.

The oil from the final reaction mixture was fractionally distilled through an efficient Stedman-type column at 10 mm., absolute pressure, to a pot temperature of 170° C., and then at 5 mm. to a final pot temperature of 210° C. Twelve fractions were collected and these ranged in size from 3 to 23 grams. Infrared spectra were run on most of the fractions and these indicated the number of major isomerization products as well as the composition of these major products. The identity of the products was established by comparison of their spectra with the spectra of the standard samples developed from the work described in Example 1. The following compounds, in order of their increasing boiling points, were found to be present in the twelve fractions specified above: hydrocarbons (cymene and non-aromatic hydrocarbons); 1-methyl-6-(α-hydroxyisopropyl)-1,3-cyclohexadiene; 8-hydroxy-α-phellandrene; 8-hydroxy-β-phellandrene; and 8-cymenol.

Analytical data obtained by fractionation of the crude isomerized verbenol and from the spectra of the fractions showed that there was present in the crude isomerization product:

| | Percent |
|---|---|
| Hydrocarbons | 22 |
| 1 - methyl - 6 - (α-hydroxyisopropyl)-1,3-cyclohexadiene | 13 |
| 8-OH-α-phellandrene | 48 |
| 8-OH-β-phellandrene | 2 |
| 8-cymenol | 2 |
| Distillation residue | 13 |
| Total | 100 |

Example 3

Pure verbenol, 500 g., was added slowly with stirring to one liter of 5% sulfuric acid at 20–25° C. The reaction was slightly exothermic and therefore a little cooling was necessary initially. After the addition was complete, the mixture was further stirred for 15½ hours at 20–25° C. The layers were separated and the aqueous phase extracted with hexane. All the organic material was then combined and washed with water and then with dilute sodium hydroxide. An infrared spectrogram of the oil showed about 50% total alcohols, most if not all of which were tertiary.

The oil was fractionated through an efficient column packed with glass helices. The distillation was conducted at 10 mm. to a final head temperature of 95° C. Twenty-five fractions were collected, and these ranged in size from 1.5 to 25 grams. Infrared spectra were made for several of the fractions and these indicated the number of major products as well as their composition. The identity of the products was established by comparison of their spectra with the spectra of standard highly purified samples developed in Example 1. The following compounds in order of their increasing boiling points were found to be present in the 25 fractions specified above: hydrocarbons (cymene and 1,5,8-menthatriene); unknown carbonyl compounds; 1-methyl-6-(α-hydroxyisopropyl) - 1,3 - cyclohexadiene; 8 - hydroxy - α - phellandrene; 8-hydroxy-β-phellandrene and 8-cymenol.

Analytical data obtained by fractionation of the crude isomerized verbenol and from the spectra of the fractions showed that there was present in the crude isomerization product:

| | Percent |
|---|---|
| Hydrocarbons (about ½ cymene and ½ 1,5,8-p-menthatriene) | 28 |
| Unknown carbonyl compounds | 6 |
| 1 - methyl - 6 - (α-hydroxyisopropyl) - 1,3-cyclohexadiene | 13 |
| 8 - hydroxy - α - phellandrene | 34 |
| 8 - hydroxy - β - phellandrene | 3.5 |
| 8 - cymenol | 0.5 |
| Higher boiling products | 15.90 |
| Total | 100.0 |

Example 4

To 500 cc. of 25% phosphoric acid stirred at 25° C., there was added slowly 500 g. of pure verbenyl acetate. Some cooling to maintain 25° C. was employed. After the addition was complete, the agitation was continued for six hours. An infrared spectrogram of the oil after two hours' stirring showed 15–20% total alcohols, and after six hours the spectra showed 30–40% total alcohols and 60–70% total esters. The absorptions other than these due to the unreacted verbenyl acetate were at the same wavelengths as those present in the spectrum of acid isomerized verbenol. This shows that verbenyl acetate can be converted with acids to the same products as produced from acid isomerization of verbenol as in Example 1.

Example 5

Pure verbenyl methyl ether was agitated with 5% sulfuric acid at 25° C. for 13 hours. Infrared spectra were run on the oil after four and thirteen hours of reaction. The four-hour sample contained some tertiary alcohols but was primarily unreacted verbenyl methyl ether. The final sample had major infrared absorption bands at the following wavelengths: 3.0 (broad), 6.23, 8.7 (broad), 10.86, 11.35, 12.57 and 13.5 $\mu$. These are the characteristic bands formed in the isomerization of verbenol, thus proving that verbenyl methyl ether, when treated with dilute acids, yields the same products as verbenol when treated with dilute acids. The infrared spectrum on the final reaction sample showed about 75% total alcohols, the remaining 25% being composed of unreacted verbenyl methyl ether, hydrocarbons and any unidentified material.

Example 6

3-pinene-2-ol (30 cc.) was shaken with 25% sulfuric acid for 3 hours at 25° C. An infrared spectrum of the final alkali-washed oil showed the presence of about 60% total alcohols and very little, if any, 3-pinene-2-ol or verbenol. The same tertiary alcohols as obtained from verbenol, acid isomerized as in Example 1, were present and an absorption band at 9.57 $\mu$ indicated a new secondary alcohol or an ether.

Example 7

Verbenol was agitated with about equal volumes of aqueous dilute acids at 25° C. whose concentration is indicated in the following table and under conditions of time as specified and with the results shown. The results were determined by infrared spectrochemical methods employing as optical standards the pure compounds produced as in Example 1. When "tertiary alcohols" are specified, it is meant the specific tertiary alcohols produced and described in Example 1.

| Aqueous Acid Concentration | Time (in hours) | Results |
|---|---|---|
| 1% $H_2SO_4$ | 22 | Approximately 65% total alcohol, very little verbenol, mostly tertiary alcohols. |
| 10% $H_2SO_4$ | 8 | Approximately 75% total alcohols, very little, if any, verbenol, mostly tertiary alcohols. |
| 18% $H_2SO_4$ | 8 | Approximately 55% total alcohols, very little, if any, verbenol, mostly tertiary alcohols. |
| 28% $H_2SO_4$ | 36 | Approximately 25% total alcohols, no verbenol, very little tertiary alcohols. |
| 10% Oxalic acid | 9½ | Approximately 60% total alcohols, some unreacted verbenol and some ester, but mostly tertiary alcohols. |
| 5% HCl | 2.5 | Approximately 55% total alcohols, almost exclusively tertiary alcohols. |

Example 8

About 5 grams of pure 8-hydroxy-β-phellandrene in 25 cc. of light naphtha was shaken with 25 cc. of 25% phosphoric acid for 4 hours. The layers were separated and the organic phase washed with saturated sodium carbonate solution. The solvent was removed to yield an oil which analyzed about 50% 8-hydroxy-α-phellandrene and about 50% 8-hydroxy-β-phellandrene by infrared spectrophotomeric analysis. The analytical results were obtained by comparison of the spectrum of the reaction mixture with the individual spectra of the pure alcohols.

Example 9

Peroxidized pinene of peroxide value about 1500 (Wheeler) was produced by passing air through pinene at about 60° C. for several days. A portion of this material when reduced with alkaline sodium sulfite, according to copending application Ser. No. 352,291, yielded on fractionation 3-pinene-2-ol and verbenol in substantial amount, but yielded none of the pinene alcohol acid conversion products claimed as part of the present invention.

However, another portion of this same peroxidized pinene was treated with 10% of its volume of distilled water, and this mixture was refluxed for 20 hours, during which time part of the unreacted pinene was removed. The oil remaining in the flask in contact with the water was now vacuum stripped to free it of a tarry high boiling residue and the distillate from this step containing unreacted pinene and higher boiling oxygenated terpenes was fractionated through an efficient column to secure oxygenated oil fractions aggregating 15.3% of the weight of the starting peroxidized pinene containing a total of 16.5% 1-methyl-6-($\alpha$-hydroxy isopropyl)-1,3-cyclohexadiene, 17.3% 8-hydroxy-$\alpha$-phellandrene and 2.5% 8-cymenol, but no verbenol or 3-pinene-2-ol.

*Example 10*

Pure verbenol (200 g.) and 200 g. of distilled water were heated with shaking at 250° C. for 2½ hours in a stainless steel autoclave. An infrared spectrum on the oil showed no alcohols, about 50% cymene and 50% of other hydrocarbons including 1,5,8-p-menthatriene. The water layer was found to contain some acetone.

*Example 11*

Pure verbenol (100 g.) and 100 g. of distilled water were heated with shaking at 175° C. for 2½ hours in a stainless steel autoclave. An infrared spectrum on the final oil showed about 70% total alcohols. There was present little or no verbenol. The major products were 8-hydroxy-$\alpha$-phellandrene; 1-methyl-6-($\alpha$-hydroxyisopropyl)-1,3-cyclohexadiene and 8-cymenol.

*Example 12*

A mixture of pure verbenol (152 g.) and 366 g. of 28% ammonium hydroxide was placed in a stainless steel autoclave and 200 lbs./sq. in. of hydrogen was admitted. The bomb was then heated for 20 hours at 150–175° C. and reached a maximum pressure of 700 lbs./sq. in. pressure. An infrared spectrum on the recovered oil showed it was substantially unconverted verbenol and none of the monocyclic tertiary alcohols could be detected.

As shown in Example 1, if menthol is to be produced, the menthene glycol, tentatively assumed to be 8-hydroxypiperitol, but which in any case is an 8-hydroxy-p-menthene-3-ol, is capable of being converted to menthol by hydrogenation to 8-hydroxy-menthol, then selective dehydration to a pulegyl compound which on hydrogenation yields a menthyl compound. Where a certain optically active menthol is desired, it is necessary to choose an optically active pinene alcohol of the proper optical sign.

Alternatively, the menthene glycol may be subjected to oxidation as by means of the Oppenauer method to the corresponding 8-hydroxy mentheneone where the carbonyl group is in the 3-position so that it is capable of conversion to a member of the menthol-menthone-piperitone-pulegone series of compounds which share the common property of containing an oxygen linkage at the 3-position or alpha to the carbon atom alkylated by the isopropyl group. Thus, for example, chromic acid oxidation of the menthene glycol first yields the 8-hydroxy menthene-3-one which may be dehydrated to the corresponding menthadienone having a double bond in the 8-position. However, if the oxidation is conducted in a strongly acidic medium, the double bond at the 8-position will shift to the 4-8 position, whereby it conjugates with the carbonyl group and thereby is stabilized. Similar considerations apply to the hydrogenated menthene diol, that is, oxidation of the menthane diol in strongly acid media first produces the 8-hydroxy-p-menthan-3-one which dehydrates under suitable conditions to the 8-menthene-3-one and the latter then is converted to 4-8-menthene-3-one, pulegone. It is therefore apparent that the menthene diol produced by our treatment is capable of various conversions by simple methods to valuable products of p-menthane series oxygenated at the 3-position.

From the foregoing it can be seen that the present invention provides for the production of many useful compounds of the terpene series and related products from the readily available initial raw material $\alpha$-pinene.

Having described the invention, what is claimed is:

1. A composition of matter comprising 1-methyl-6-(2-hydroxyisopropyl)-1,3-cyclohexadiene, 8-hydroxy-$\alpha$-phellandrene, 8-hydroxy-$\beta$-phellandrene, cymene-8-ol, and a 3,8-dihydroxy-para-menthene in which the double bond is a cyclic double bond involving the number 1 carbon atom and which boils in the range above the boiling point of cymene-8-ol up to about 134° C. at 1½ mm. pressure as the essential ingredients.

2. 8-hydroxy-$\alpha$-phellandrene.

3. 8-hydroxy-$\beta$-phellandrene.

4. 1-methyl-6-($\alpha$-hydroxyisopropyl)-1,3-cyclohexadiene.

5. The process which comprises oxidizing p-menthane-3,8-diol with chromic acid.

References Cited in the file of this patent

Beilstein (4th ed., 1923), Band VI, 748.
Bodendorf: Chem. Abst. 27 (1933), 4472.